United States Patent Office 3,311,612
Patented Mar. 28, 1967

3,311,612
PROCESS FOR PREPARING 5-ARYL-3H-1,4-BENZO-DIAZEPIN-2-(1H)-ONES
Earl Reeder, Nutley, and Leo Henryk Sternbach, Upper Montclair, N.J., assignors to Hoffmann-La Roche Inc., Nutley, N.J., a corporation of New Jersey
No Drawing. Original applications Nov. 2, 1961, Ser. No. 149,527, now Patent No. 3,136,815, dated June 9, 1964; Nov. 20, 1961, Ser. No. 154,921; Nov. 20, 1961, Ser. No. 154,926, now Patent No. 3,270,053, dated Aug. 30, 1966; Nov. 20, 1961, Ser. No. 154,927, now Patent No. 3,239,564, dated Mar. 8, 1966. Divided and this application Nov. 27, 1963, Ser. No. 326,336
Claims priority, application Switzerland, Dec. 2, 1960, 13,490/60, 13,492/60, 13,493/60
7 Claims. (Cl. 260—239.3)

This application is a continuation-in-part of each of Ser. No. 858,564, filed Dec. 10, 1959, and now abandoned; Ser. No 858,597, filed Dec. 10, 1959, and now U.S. Patent 3,051,701, issued Aug. 28, 1962; and Ser. No. 75,690, filed Dec. 14, 1960, and now abandoned; and is a divisional of each of Ser. No. 149,527, filed Nov. 2, 1961, and now U.S. Patent 3,136,815, issued June 9, 1964; Ser. No. 154,921, filed Nov. 20, 1961; Ser. No. 154,926, filed Nov. 20, 1961, and now U.S. Patent 3,270,053, issued Aug. 30, 1966; and Ser. No. 154,927, filed Nov. 20, 1961, and now U.S. Patent 3,239,564, issued Mar. 8, 1966.

This invention relates to processes of making novel 5-aryl-3H-1,4-benzodiazepin-2(1H)-ones.

The novel 5-aryl-3H-1,4-benzodiazepin-2(1H)-ones and derivatives thereof to which the invention relates are selected from the group consisting of compounds of the formula (I)

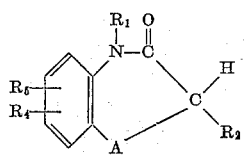

and pharmaceutically acceptable salts thereof, wherein A is

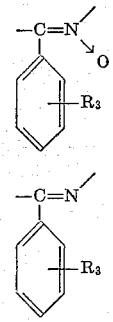

and

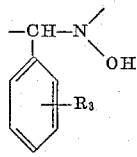

$R_1$ is selected from the group consisting of hydrogen, lower alkyl, lower alkenyl, lower alkynyl, aralkyl and cyano-lower alkyl; $R_2$ is selected from the group consisting of hydrogen, lower alkyl, lower alkoxy-lower alkyl, phenyl and hydroxybenzyl; $R_3$, $R_4$ and $R_5$ are selected from the group consisting of hydrogen, halogen and lower alkyl.

As is evident from the above, the novel 5-aryl-3H-1,4-benzodiazepin-2(1H)-ones of the invention can be particularized as being compounds of the following structural formulas (II)

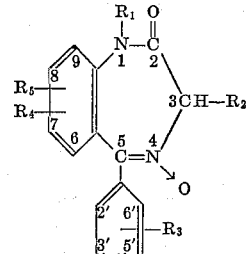

(III)

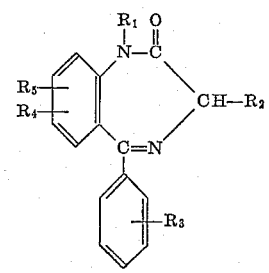

and their respective 4,5-dihydro derivatives.

The 4,5-dihydro derivatives of the compounds represented by Formula II above are represented by the following formula (IV)

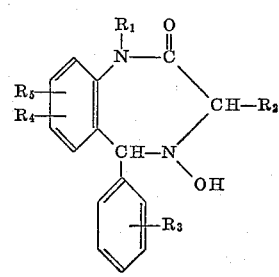

The numbering of the benzodiazepine ring system is shown in Formula II above for the purposes of convenience. The symbols R is the above Formulas I–IV inclusive have the following significance. $R_1$ is selected from the group consisting of hydrogen, lower alkyl, lower alkenyl, lower alkynyl, aralkyl and cyano-lower alkyl; $R_2$ is selected from the group consisting of hydrogen, lower alkyl, lower alkoxy-lower alkyl, phenyl and hydroxybenzyl; $R_3$, $R_4$ and $R_5$ are selected from the group consisting of hydrogen, halogen and lower alkyl.

In addition to the compounds within the scope of Formulas I–V above there are also encompassed within the invention the pharmaceutically acceptable salts of said compounds. Certain compounds of the above formula form pharmaceutically acceptable acid addition salts and pharmaceutically acceptable quaternary ammonium salts. Thus the basic compounds of the invention, i.e. the compounds of Formulas III and IV above, form pharmaceutically acceptable acid addition salts with inorganic and organic acids; i.e. the hydrohalic acids such as hydrochloric acid and hydrobromic acid; with other mineral acids such as sulfuric acid; phosphoric acid, nitric acid and the like; and with organic acids such as tartaric acid, citric acid, camphorsulfonic acid, ethanesulfonic acid, toluenesulfonic acid, salicylic acid, ascorbic acid, maleic acid, succinic acid, mandelic acid, formic acid, acetic acid, and the like.

As used in this disclosure the terms herein below defined have the following significance. The term lower alkyl refers to such straight chain and branched chain lower alkyl groups as methyl, ethyl, propyl, isopropyl, butyl, isobutyl, t-butyl and the like. The term lower alkenyl refers to groups such as allyl, butenyl (including the various isomers) and the like. The term lower alkynyl refers to groups such as propargyl, and the like. The term cyano-lower alkyl refers to groups such as $\beta$-cyanoethyl, and the like. The term lower alkoxy-lower alkyl refers to groups such as methoxymethyl, and the like. The term halogen refers to all four halogens, i.e. iodine, bromine, chlorine and fluorine. The term $\alpha$-halolower alkanoyl refers to acyl groups bearing a halogen substituent on the $\alpha$-carbon atom, i.e. groups such as chloroacetyl, bromoacetyl, $\alpha$-bromopropionyl, and the like.

The following paragraphs contain a general outline of the processes of the invention and represent merely a synopsis of all the processes of the invention. These processes are set forth in detail in the examples of this disclosure. The novel processes are part of the invention.

The compounds of Formula II may be synthesized by several methods, for example a 2-aminobenzophenone can be reacted with hydroxylamine or a salt thereof, such as hydroxylamine hydrochloride, in a medium such as ethanol, to form a 2-aminobenzophenone oxime, which can then be acylated with an $\alpha$-halo-lower alkanoyl halide in the presence of a base, e.g., an alkali hydroxide, for example an alkali metal hydroxide such as sodium hydroxide. This reaction yields a 2-($\alpha$-halo-lower alkanoylamino)-benzophenone oxime which, after further treatment with one mole of base, is converted to a 5-phenyl-3H-1,4-benzodiazepin-2(1H)-one 4-oxide (represented by Formula II). Another method of obtaining the same compounds is by cyclizing a 2-aminobenzophenone oxime by means of a reaction with an $\alpha$-halo-lower alkanoyl halide in the presence of an acid, such as glacial acetic acid. This reaction produces, for example, a 2-halomethyl-4-phenylquinazoline 3-oxide, which can then be converted to the corresponding compound represented by Formula II by treatment with an alkali hydroxide, for example an alkali metal hydroxide such as sodium hydroxide.

Treatment of either a 2-methylamino-5-phenyl-3H-1,4-benzodiazepine 4-oxide or a 2-(N-methylacetamido)-5-phenyl-3H-1,4-benzodiazepine 4-oxide with a strong acid, for example a hydrohalic acid such as hydrochloric acid, provides another method of producing compounds of Formula II.

Oxidation of a 5-phenyl-3H-1,4-benzodiazepin-2(1H)-one (the methods of synthesis of which will be outlined below) with hydrogen peroxide provides still another route to the compounds of Formula II.

The compounds of Formula III (i.e., 5-phenyl-3H-1,4-benzodiazepin-2(1H)-ones) can also be prepared by a variety of methods. For example a 5-phenyl-3H-1,4-benzodiazepin-2(1H)-one 4-oxide can be reduced with phosphorus trichloride or with hydrogen in the presence of a Raney nickel catalyst.

The 2-(N-methylacetamido)-5-phenyl-3H-1,4-benzodiazepine 4-oxide compounds as well as the 2-(N-methylacetamido)-5-phenyl-3H-1,4-benzodiazepine compounds referred to above are not a part of the present invention, but the preparation of novel compounds is set forth below in the examples in order that the present disclosure may be more complete. Similarly, the 2-methylamino-5-phenyl-3H-1,4-benzodiazepine 4-oxides referred to above are not part of this invention, but also, the preparation of novel compounds is set forth in the examples below in order that the present disclosure may be more complete.

The 4,5-dihydro derivatives corresponding to Formula IV can be produced from the compounds of Formula II by reduction. For example, compounds corresponding to Formula II can be reduced with hydrogen in the presence of a platinum oxide catalyst to yield 4-hydroxy-5-phenyl-4,5-dihydro-3H-1,4-benzodiazepin-2(1H)-ones corresponding to Formula IV.

The compounds corresponding to Formulas II–IV wherein $R_1$ is hydrogen can be modified so that $R_1$ is other than hydrogen by a variety of methods. Compounds of Formulas II–IV wherein $R_1$ is other than hydrogen can be obtained by reacting corresponding compounds wherein $R_1$ is hydrogen with diazomethane, di-lower alkyl sulfate, lower alkyl halide, aralkyl halide, lower alkenyl halide, lower alkynyl halide or acrylonitrile in a medium such as ether, benzene, alcohol, dimethylformamide or dioxane.

The 2-aminobenzophenone compounds used as starting materials in numerous processes of the invention can themselves be prepared by a variety of methods. Novel 2-aminobenzophenone compounds produced by the methods of the invention and used in the syntheses of the invention are a part of the invention. In one method of preparing the 2-aminobenzophenone compounds a 2-acetamidobenzoic acid or a 2-aminobenzoic acid can be reacted with acetic anhydride to form a 2-methyl-4H-3,1-benzoxazin-4-one which can then be reacted with a Grignard agent, for example, a phenyl Grignard reagent such as phenyl magnesium bromide, to form a 2-acetamidobenzophenone. 2-acetamidobenzophenone compounds can be hydrolyzed by standard methods, such as by the use of ethanol and hydrochloric acid, to yield a 2-aminobenzophenone. Another method of preparing the 2-amino-benzophenones is to condense a benzoyl halide with an aniline compound, and then hydrolyze the formed intermediate to obtain the desired product.

2-aminobenzophenones wherein the nitrogen atom bears alkyl, alkenyl and aralkyl substituents can be formed by reacting a 2-aminobenzophenone with tosylchloride to form a 2-tosylamidobenzophenone. The hydrogen atom of the tosylamino group can be replaced by the desired substituent and the desired N-substituted 2-aminobenzophenone obtained by subsequently splitting off the tosyl group. One way of splitting off the tosyl group is by heating the N-substituted 2-aminobenzophenone in the presence of acid.

It is to be understood from the above synoptic discussion of the processes of this invention that the invention includes a variety of intermediates, e.g. 2-aminobenzophenones, N-substituted 2-aminobenzophenones, 2-aminobenzophenone oximes, N-substituted 2-aminobenzophenone oximes, 2-methyl-4H-3,1-benzoxazin-4-ones and others as mentioned above, as well as the compounds corresponding to Formula I (i.e. to Formulas II–IV).

The compounds represented by Formula I (i.e. to Formulas II–IV) inclusive are useful as sedatives, muscle relaxants and anticonvulsants. They can be administered by incorporating therapeutic dosages in a conventional liquid or solid vehicle, to provide elixirs, suspensions, capsules, tablets, powders and the like, according to accepted pharmaceutical practice. The various compounds corresponding to Formula I are also useful as intermediates in the synthesis of other compounds corresponding to Formula I, as discussed above and illustrated in the examples.

In the following examples the temperatures referred to are all in the centigrade scale.

The following examples illustrate the compounds and processes of the invention.

EXAMPLE 1

600 ml. of acetic anhydride were added to a solution of 100 g. of 7-chloro-2-methylamino-5-phenyl-3H-1,4-benzodiazepine 4-oxide in 1.2 liters of dry pyridine. The mixture was left at room temperature for 14 hours and concentrated in vacuo. The residue was crystallized from a mixture of ether and petroleum ether to obtain 7-chloro-2-(N-methylacetamido)-5-phenyl-3H-1,4-benzodiazepine 4-oxide, M.P. 186–187°.

250 ml. of 1 N hydrochloric acid was added at room temperature to a solution of 84.4 g. (0.25 mol) of 7- chloro - 2-(N-methylacetamido) - 5-phenyl - 3H - 1,4-benzodiazepine 4-oxide in 1250 ml. of dioxane (prepared by heating). The mixture was left at room temperature for 14 hours, diluted with ice water, made strongly alkaline with sodium hydroxide and extracted with ether to remove impurities. The product, 7-chloro-5-phenyl-3H-1, 4-benzodiazepin-2-(1H)-one 4-oxide, remained in the aqueous alkaline solution which was neutralized with acetic acid and extracted with methylene chloride. The methylene chloride solution was dried and concentrated to a small volume. The pure, crystalline product was precipitated by the addition of petroleum ether and crystallized from alcohol, M.P. 235–236°, with dec.

EXAMPLE 2

To a suspension of 10.2 g. (30 mmol.) of 6-chloro-2-chloromethyl-4-phenylquinazoline 3-oxide hydrochloride in 150 ml. of dioxane were added 60 ml. of 1 N sodium hydroxide. The mixture was left at room temperature for 14 hours, concentrated in vacuo to a small volume, diluted with ice cold 3 N sodium hydroxide and extracted with methylene chloride. The methylene chloride solution was discarded. The alkaline solution containing the reaction product was acidified with hydrochloric acid and extracted with methylene chloride. The methylene chloride solution was dried, concentrated in vacuo and the residue was crystallized from alcohol to obtain 7-chloro-5-phenyl-3H-1,4-benzodiazepin-2(1H)-one 4-oxide.

EXAMPLE 3

To a stirred suspension of 10 g. (35 mmol.) of 7-chloro-5-phenyl-3H-1,4-benzodiazepin-2(1H)-one 4-oxide in approximately 150 ml. of methanol was added in portions an excess of a solution of diazomethane in ether. After about one hour, almost complete solution had occurred and the reaction mixture was filtered. The filtrate was concentrated in vacuo to a small volume and diluted with ether and petroleum ether. The reaction product, 7-chloro - 1-methyl - 5-phenyl - 3H-1,4-benzodiazepin - 2 (1H)-one 4-oxide, crystallized in colorless prisms. The product was filtered off and recrystallized from acetone, M.P. 188–189°.

EXAMPLE 4

2.78 g. (52.5 mmol.) of sodium methoxide were added to a stirred, warm solution of 15 g. (52.5 mmol.) of 7-chloro-5-phenyl-3H-1,4-benzodiazepin-2(1H)-one 4-oxide in 700 ml. of methanol. After 5 minutes, 5 ml. (52.5 mmol.) of dimethylsulfate were added. The reaction mixture was refluxed for one hour, concentrated in vacuo to a small volume and diluted with ether and petroleum ether. The crystals which formed were filtered off and washed with water to obtain 7-chloro-1-methyl-5-phenyl-3H-1,4-benzodiazepin-2(1H)-one 4-oxide.

EXAMPLE 5

14.3 g. of 7-chloro-5-phenyl-3H-1,4-benzodiazepin-2 (1H)-one 4-oxide were dissolved in 300 ml. of dioxane and hydrogenated in the presence of 20 g. of Raney nickel at atmospheric pressure and room temperature. The hydrogenation was stopped after the absorption of one mol of hydrogen. The reaction mixture was filtered, concentrated in vacuo to a small volume and diluted with ether and petroleum ether. The precipitated crystals were recrystallized from acetone. The product, 7-chloro-5-phenyl-3H-1,4-benzodiazepin-2(1H)-one, formed colorless plates melting at 216–217°.

EXAMPLE 6

A solution of 15 g. of 7-chloro-5-phenyl-3H-1,4-benzodiazepin-2(1H)-one 4-oxide and 25 ml. of phosphorous trichloride in 700 ml. of chloroform was refluxed for 30 minutes. The solution was then poured on ice, the mixture was made alkaline with 50% sodium hydroxide and then the organic layer was separated. The aqueous layer was extracted with methylene chloride. Then the organic layers were combined, dried, filtered over diatomaceous earth to remove a fine amorphous impurity and the filtrate was concentrated in vacuo to dryness. The residue was crystallized from acetone to obtain 7-chloro-5-phenyl-3H-1,4-benzodiazepin-2(1H)-one.

EXAMPLE 7

A mixture of 23.15 g. (0.1 mol) of 2-amino-5-chlorobenzophenone, 20.8 g. (0.15 mol) of glycine ethyl ester hydrochloride and 50 ml. of pyridine was heated. The pyridine was slowly distilled off while the temperature of the reaction mixture was maintained at 120 to 125° by the addition of fresh pyridine to the mixture at the same rate as it was distilled off. The distillation was continued for 4 hours, a total of 120 ml. of pyridine being collected. The mixture was then concentrated in vacuo to a syrup and partitioned between 200 ml. of benzene and 200 ml. of water. The extraction was repeated with 200 ml. of water. During the second washing, some of the product began to crystallize and was filtered off. The benzene solution was separated, diluted with 100 ml. of petroleum ether and left at 0° for 15 hours. The crystalline product, 7-chloro-5-phenyl-3H-1,4-benzodiazepin-2(1H)-one, was filtered off, washed with some benzene until almost colorless and finally with some petroleum ether. The product was then recrystallized from acetone.

EXAMPLE 8

A solution of 2.7 g. (10 mmol) of 7-chloro-5-phenyl-3H-1,4-benzodiazepin-2(1H)-one in 15 ml. of glacial acetic acid was heated with stirring on a steam bath with 1.2 ml. of a 30% solution (10 mmol) of hydrogen peroxide. Three additional 0.6 ml. portions of hydrogen peroxide were added at two hour intervals and then the heating was continued for a total of 10 hours. After standing for 36 hours at room temperature, the solution was diluted with water and ice, neutralized by the addition of an equivalent amount of potassium carbonate solution and extracted with methylene chloride. The methylene chloride solution was then extracted portionwise with 160 ml. of 3 N hydrochloric acid in order to remove unreacted starting material. The organic layer was dried, concentrated in vacuo and the residue was crystallized from methylene chloride, ether and petroleum ether to obtain 7-chloro-5-phenyl-3H-1,4-benzodiazepin-2(1H)-one 4-oxide.

EXAMPLE 9

7.6 g. of 7-chloro-5-phenyl-3H-1,4 - benzodiazepin-2(1H)-one 4-oxide were dissolved in 150 ml. of glacial acetic acid and hydrogenated at room temperature and atmospheric pressure in the presence of 0.6 g. of platinum oxide until the hydrogen uptake had slowed down considerably. This occurred after 6 hours with the absorption of about 1.5 mols of hydrogen. The reaction mixture was then heated, diluted with more glacial acetic acid to dissolve the precipitated hydrogenation product and filtered over diatomaceous earth. The filtrate was concentrated in vacuo to a small volume and the crystalline reaction product was filtered off. After recrystallization from acetic acid, the product, 7-chloro-4-hydroxy-5-phenyl-4,5-dihydro-3H-1,4-benzodiazepin - 2(1H)-one, formed colorless needles melting at 215–216°.

EXAMPLE 10

10 ml. of 1 N sodium hydroxide were added at room temperature to a solution of 2.84 g. (10 mmol) of 6-methyl-2-chloromethyl-4-phenylquinazoline 3-oxide in 75 ml. of dioxane. After 15 hours, the mixture was diluted with ice water and extracted with ether. The ether extract containing unchanged starting material was discarded. The aqueous layer was acidified with dilute hydrochloric acid and extracted with methylene chloride. The methylene chloride solution was dried, concentrated in vacuo and the residue craystallized from a mixture of methylene chloride and petroleum ether. The 7-methyl-5-phenyl-3H-1,4-benzodiazepin-2(1H)-one 4-oxide formed colorless rhombic plates melting at 226–227°.

EXAMPLE 11

20 ml. of 1 N sodium hydroxide were added to a suspension of 7 g. (20 mmol) of 6-bromo-2-chloromethyl-4-phenylquinazoline 3-oxide in 75 ml. of dioxane. The mixture was left at room temperature for 14 hours, concentrated in vacuo to a small volume, diluted with ice cold 3 N sodium hydroxide and extracted with methylene chloride. The methylene chloride solution was discarded. The alkaline solution containing the reaction product was acidified with hydrochloric acid and extracted with methylene chloride. The methylene chloride solution was dried, concentrated in vacuo and the residue crystallized from a mixture of methylene chloride and petroleum ether. The product, 7-bromo-5-phenyl-3H-1,4-benzodiazepin-2(1H)-one 4-oxide, melted at 230–231°.

EXAMPLE 12

20 ml. of acetic anhydride were added to a solution of 3.9 g. of 7,8-dimethyl-2-methylamino-5-phenyl-3H-1,4-benzodiazepine 4-oxide in 20 ml. of pyridine. The solution was left at room temperature for 20 hours and then concentrated in vacuo. The residue was crystallized from a mixture of acetone and ether to obtain 7,8-dimethyl-2-(N-methylacetamido)-5-phenyl-3H-1,4-benzodiazepine 4-oxide in the form of colorless prisms melting at 193–194°, with dec.

6 ml. of 1 N hydrochloric acid were added at room temperature to a solution of 2 g. (6 mmol) of 7.8-dimethyl-2-(N-methylacetamido) - 5 - phenyl-3H-1,4-benzodiazepine 4-oxide in 30 ml. of dioxane. After 15 hours, ice water and 3 N sodium hydroxide were added and the mixture was extracted with methylene chloride. The organic layer containing impurities was discarded. The aqueous alkaline solution was acidified with dilute hydrochloric acid and extracted with methylene chloride. The methylene chloride solution was dried and concentrated in vacuo. The residues, 7,8-dimethyl-5-phenyl-3H-1,4-benzodiazepin-2(1H)-one 4-oxide, crystallized from a mixture of methylene chloride and petroleum ether in the form of colorless plates melting at 234–235°.

EXAMPLE 13

500 g. of p-bromoaniline were added with stirring at 120° to 995 g. of p-toluoyl chloride, causing a strong evolution of hydrogen chloride. The mixture solidified and was molten by heating to 200°. 500 g. of anhydrous zinc chloride were added with stirring causing again the evolution of hydrogen chloride. The mixture was heated for 2 hours to 230° and then poured with stirring into 2 liters of .05 N hydrochloric acid. The precipitated solid was filtered off, pulverized, suspended in 4 liters of 0.5 N hydrochloric acid and refluxed for one hour. The mixture was cooled. The wet resinous material was filtered off and dissolved in a mixture of 1.5 liters of acetic acid and 0.75 liters of concentrated hydrochloric acid. The solution was refluxed for 18 hours and concentrated in vacuo. To the residue were added 3 liters of benzene and an excess of sodium hydroxide. The precipitated p-toluic acid sodium salt was filtered off and the aqueous layer discarded. The benzene layer was washed with 2 N sodium hydroxide and then with an excess of 2 N hydrochloric acid. The benzene layer was dried and concentrated, yielding crude 2-amino-5-bromo-4'-methylbenzophenone. After crystallization from a mixture of benzene and petroleum ether, the product formed yellow plates melting at 105–106°.

A mixture of 50 g. of 2-amino-5-bromo-4'-methylbenzophenone, 28 g. of hydroxylamine hydrochloride and 250 ml. of alcohol was refluxed for 15 hours. The solution was neutralized with aqueous sodium carbonate, diluted with 100 ml. of water and 100 ml. of benzene. The precipitated crystals of 2-amino-5-bromo-4'-methylbenzophenone α-oxime were filtered off. From the filtrate the benzene layer was separated, dried and partly concentrated in vacuo yielding an additional quantity of the product. The mother liquors were diluted with petroluem ether to obtain 2-amino-5-bromo-4'-methylbenzophenone β-oxime. The α-oxime was crystallized from ether and melted at 204–205°. The β-oxime was crystallized from a mixture of benzene and petroleum ether and melted at 115–116°.

Into a stirred, cooled solution (10–15°) of 9.15 g. of 2-amino-5-bromo-4'-methylbenzophenone α-oxime in 45 ml. of dioxane were introduced in small portions 3 ml. of chloracetyl chloride and an equivalent amount of 3 N sodium hydroxide. The chloracetyl chloride and sodium hydroxide were added alternately at a rate so as to keep the temperature below 15° and the mixture neutral or slightly alkaline. After 30 minutes, the mixture was acidified to pH 5 with dilute hydrochloric acid, diluted with water and extracted with ether. The ether extract was dried, concentrated in vacuo and the oily residue was crystallized by the addition of ether. The product, 2-chloracetamido - 5 - bromo - 4' - methylbenzophenone α-oxime, crystallized from dioxane in the form of colorless prisms melting at 179–180°.

A solution of 3 g. of 2-chloracetamido-5-bromo-4'-methylbenzophenone α-oxime in 25 ml. of boiling acetic anhydride was cooled to 75° and saturated with hydrogen chloride. The mixture was left at room temperature for 30 minutes, heated again for 2 hours at 75°, saturated again with hydrogen chloride and concentrated in vacuo. The residue was crystallized from a mixture of methylene chloride and petroleum ether forming yellow needles of 6-bromo-2-chloromethyl-4-(p-tolyl)-quinazoline 3-oxide, melting at 162–164°.

20 g. of 6-bromo-2-chloromethyl-4-(p-tolyl)-quinazoline 3-oxide were added in portions at 0° to 150 ml. of 50% solution of methylamine in methanol. The reaction mixture was stirred at room temperature for one hour, then cooled to 5° and filtered. The reaction product remaining on the filter, 7-bromo-2-methylamino-5-(p-tolyl)-3H-1,4-benzodiazepine 4-oxide, was recrystallized from ethanol forming yellow prisms melting at 255–256°.

A solution of 3 g. of 7-bromo-2-methylamino-5-(p-tolyl)-3H-1,4-benzodiazepine 4-oxide in a mixture of 16 ml. of pyridine and 16 ml. of acetic anhydride was left at room temperature for 16 hours. The precipitated starting material was filtered off and the mother liquors were concentrated in vacuo. The residue was crystallized by the addition of ether, petroleum ether and acetone. After recrystallization from a mixture of acetone and petroleum ether, the product, 7-bromo-2-(N-methylacetamido)-5-(p-tolyl)-3H-1,4-benzodiazepine 4-oxide, formed colorless needles melting at 209–210°.

3 ml. of 1 N hydrochloric acid were added at room temperature to a solution of 1.2 g. (3 mmol) of 7-bromo-2-(N-methylacetamido)-5 - (p-tolyl)-3H-1,4 - benzodiazepine 4-oxide in 30 ml. of alcohol. The mixture was refluxed for one hour, partly concentrated in vacuo and diluted with ice water. The crystalline reaction product precipitated out, was filtered off and recrystallized from a mixture of methylene chloride and petroleum ether. The 7-bromo-5-(p-tolyl)-3H-1,4 - benzodiazepin - 2(1H) - one 4-oxide formed colorless plates melting at 237–238°.

EXAMPLE 14

To 500 g. of molten p-chloraniline heated to 120° were added with stirring 750 ml. of p-chlorobenzoyl chloride, causing a violent evolution of hydrogen chloride. The mixture then solidified and was molten by heating to 200°. At this temperature, 500 g. of anhydrous zinc chloride were introduced. The stirring was continued and the mixture was heated at 230–242° for 2 hours. It was then poured into one liter of 0.5 N hydrochloric acid. The precipitated solid was filtered off, pulverized, suspended in one liter of 0.5 N hydrochloric acid and refluxed for one hour. The mixture was then cooled. The resinous material was filtered off and dissolved in a mixture of 14 liters of acetic acid and 3 liters of concentrated hydrochloric acid. The solution was refluxed for 18 hours and concentrated in vacuo. The residue was dissolved in 4 liters of benzene and stirred with an excess of alkali. The precipitated sodium p-chlorobenzoate was filtered off and the benzene solution concentrated to obtain the crude product. The 2-amino-5,4'-dichlorobenzophenone was crystallized from alcohol to obtain yellow needles melting at 118–119°.

A solution of 169 g. of 2-amino-5,4'-dichlorobenzophenone and 73 g. of hydroxylamine hydrochloride in 730 ml. of alcohol was refluxed for 16 hours. The solution was concentrated in vacuo. The residue was diluted with water and ether and neutralized with 40% sodium hydroxide. The ether layer was separated, dried with sodium sulfate and concentrated in vacuo. The residue was dissolved in 100 ml. of benzene and crystallized by the gradual addition of about 2 liters of petroleum ether. The crystalline mixture was cooled for 14 hours at 5°. The precipitated crude 2-amino-5,4'-dichlorobenzophenone oxime was dissolved in 900 ml. of boiling benzene and treated with charcoal. The hot mixture was filtered and the oxime was crystallized by the addition of 1,000 ml. of petroleum ether. After crystallization from a mixture of benzene and petroleum ether, the pure α-oxime was obtained in the form of colorless prisms, melting at 151–154°.

15 ml. of chloracetyl chloride were added over a period ½ hour to a 50° solution of 28 g. of 2-amino-5,4'-dichlorobenzophenone α-oxime in 250 ml. of glacial acetic acid. The mixture was left at room temperature for 14 hours and then concentrated in vacuo. The residue was dissolved in hot methylene chloride and washed with ice cold sodium hydroxide and water. The organic layer was separated, dried and concentrated in vacuo to about 300 ml. It was then diluted with 600 ml. of petroleum ether and cooled. The reaction product, 6-chloro-2-chloromethyl - 4 - (4 - chlorophenyl) - quinazoline 3-oxide, crystallized in fine yellow needles melting at 163–164°.

27 g. of 6-chloro-2-chloromethyl-4-(4-chlorophenyl)-quinazoline 3-oxide were added in portions at 0° to 150 ml. of a 50% solution of methylamine in methanol. The reaction mixture was stirred at room temperature for 19 hours, then cooled to 5° for 6 hours and filtered. The reaction product remaining on the filter was recrystallized from ethanol to obtain yellow prisms of 7-chloro-2-methylamino - 5 - (4 - chlorophenyl) - 3H - 1,4 - benzodiazepine 4-oxide melting at 254–255°.

40 ml. of acetic anhydride were added at room temperature to a solution of 6 g. of 7-chloro-2-methylamino-5-(4-chlorophenyl)-3H-1,4-benzodiazepine 4-oxide in 50 ml. of pyridine. After 15 hours, a small amount of starting material which had precipitated out was filtered off. The solution was then concentrated in vacuo to a small volume, diluted with methylene chloride and washed with ice cold dilute sodium hydroxide and acid. The methylene chloride solution was then dried, concentrated in vacuo and the residue crystallized from acetone. The product, 7 - chloro - 2 - (N - methylacetamido) - 5 - (4-chlorophenyl)-3H-1,4-benzodiazepine 4-oxide, formed colorless plates melting at 191–192°.

4 ml. of 1 N hydrochloric acid were added at room temperature to a solution of 1.4 g. (4 mmol) of 7-chloro-2 - (N - methylacetamido) - 5 - (4 - chlorophenyl) - 3H-1,4-benzodiazepine 4-oxide in 30 ml. of alcohol. The mixture was refluxed for one hour, partly concentrated in vacuo and diluted with ice water. The crystalline reaction product, 7-chloro-5-(4-chlorophenyl)-3H-1,4-benzodiazepin-2(1H)-one 4-oxide, was filtered off and recrystallized from methanol in the form of colorless plates melting at 250–252°.

EXAMPLE 15

1.08 g. (0.02 mol) of sodium methoxide were added to a solution of 5.4 g. (0.02) mol) of 7-chloro-5-phenyl-3H-1,4-benzodiazepin-2(1H)-one 4-oxide and 300 ml. of benzene. 100 ml. of benzene were distilled off in order to remove the liberated methanol, then 1.73 ml. (0.02 mol) of allyl bromide were added. The solution was refluxed for 2.5 hours, then washed with water, dried over sodium sulfate, filtered and concentrated in vacuo. The residue, 7-chloro-1-allyl-5-phenyl-3H-1,4-benzodiazepin-2(1H)-one 4-oxide, crystallized from a mixture of acetone and petroleum ether in colorless plates, M.P. 150–151°.

EXAMPLE 16

A mixture of 3 g. (0.01 mol) of 7-chloro-1-methyl-5-phenyl-3H-1,4-benzodiazepin-2(1H)-one 4-oxide, 30 ml. of chloroform and 1 ml. of phosphorus trichloride was refluxed for one hour. The reaction mixture was then poured on ice and stirred with an excess of 40% sodium hydroxide solution. The chloroform was then separated, dried with sodium sulfate, filtered and concentrated in vacuo. The residue was dissolved in methylene chloride and crystallized by the addition of petroleum ether. The product, 7 - chloro - 1 - methyl - 5 - phenyl - 3H - 1,4-benzodiazepin-2(1H)-one, was recrystallized from a mixture of acetone and petroleum ether forming colorless plates melting at 125–126°.

EXAMPLE 17

7 - chloro - 5 - (2 - chlorophenyl) - 2 - methylamino - 3H-1,4-benzodiazepine 4-oxide (5 g.) was dissolved in alcohol (50 ml.) and 37 ml. NaOH (1 N) added. The clear solution was kept standing overnight, the main amount of alcohol was removed in vacuo and the solution was extracted with ether and CH$_2$Cl$_2$. The water phase was acidified with HCl and extracted with ether and CH$_2$Cl$_2$. The organic phase yielded on evaporation crystals of 7-chloro-5-(2-chlorophenyl)-3H-1,4-benzodiazepine-2-(1H)-one-4-oxide which after recrystallization from benzene-ether melted at 248–249° (dec.).

The 7 - chloro - 5 - (2 - chlorophenyl) - 2 - methylamino-3H-1,4-benzodiazepine-4-oxide used as a starting material in this example is not a part of the present invention, but the preparation thereof is disclosed below in order that the present disclosure may be complete.

2-amino-2',5-dichlorobenzophenone (171 g.) and hydroxylamine hydrochloride (134 g.) was dissolved in a mixture of pyridine (500 ml.) and piperidine (5 ml.) which was refluxed for 16 hours. The solvent was removed in vacuo, and the residue treated with water and ether. The ether solution was repeatedly extracted with 2 N HCl. The acidic aqueous phase was neutralized and extracted with ether. After drying and concentrating the ether solution, crystals were obtained on addition of petroleum ether. Recrystallization from a mixture of benzene, and petroleum ether gave crystals of 2-amino-2',5-dichlorobenzophenone oxime, which melted at 137–139°.

2-amino-2',5-dichlorobenzophenone oxime (22 g.) was dissolved in acetic acid (100 ml.) and chloroacetylchloride (22.5 g.) added. The mixture was kept on the steam bath for 5 hours during which time a slow stream of HCl was passed into the flask. After concentrating the solution, crystals separated on cooling and were filtered off. The crystals were treated with an ice cold NaCO$_3$ solution and a mixture of CH$_2$Cl$_2$ and ether. The organic phase after washing with water and concentrating gave crystals of 6-chloro-2-chloromethyl-4-(2-chlorophenyl)-quinazoline-3-oxide which after recrystallization from CH$_2$Cl$_2$-petroleum ether had a M.P. of 140–143°.

6 - chloro - 2 - chloromethyl - 4 - (2 - chlorophenyl)

quinazoline-3-oxide (4 g.) was dissolved in 60 ml. of a solution of CH₃NH₂ in methanol (6 N) and kept at room temperature overnight. The residue after evaporation of the solvent was taken up in CH₂Cl₂, the solvent washed with water. Crystals of 7-chloro-5-(2-chlorophenyl)-2-methylamino-3H-1,4-benzodiazepine-4-oxide were obtained with a M.P. 247–248° (dec.).

EXAMPLE 18

To a warm, stirred suspension of 28.6 g. (0.1 mol) of 7-chloro-5-phenyl-3H-1,4-benzodiazepin-2(1H)-one 4-oxide in 450 ml. of dry benzene were added 5.4 g. of sodium methoxide. The mixture was refluxed and part of the solvent was distilled off to remove the liberated methanol. To this clear solution were added 11.5 ml. of benzylchloride, 1 g. of sodium iodide and 200 ml. of acetonitrile. The mixture was refluxed for 15 hours, then concentrated in vacuo to a smaller volume and diluted with water. The benzene layer was separated, dried over sodium sulfate and filtered. The filtrate was concentrated in vacuo and the oily residue dissolved in a small amount of a mixture of equal parts (by volume) of methylene chloride and petroleum ether. This was adsorbed on a column (3.5 cm. diameter) prepared with 450 g. of aluminum oxide and the above mixture of solvents. The elution with 2 l. of the same solvent mixture removed impurities. The reaction product was eluted first with 2 l. of methylene chloride and then with 500 ml. of methylene chloride containing 10% methanol. The methylene chloride and methylene chloride-methanol eluates were combined and concentrated in vacuo to dryness. The residue was crystallized from a mixture of methylene chloride, ether and petroleum ether, yielding crude 1-benzyl-7-chloro-5-phenyl-3H-1,4-benzodiazepin-2(1H)-one 4-oxide. The product forms colorless prisms melting at 151–152° C.

EXAMPLE 19

A solution of 7.5 g. of 1-benzyl-7-chloro-5-phenyl-3H-1,4-benzodiazepin-2(1H)-one 4-oxide in 110 cc. of methanol was hydrogenated in the presence of 5 g. of wet Raney nickel at room temperature and atmospheric pressure. The uptake stopped after the absorption of 1 mole of hydrogen. The mixture was filtered, the solution concentrated in vacuo to small volume and crude crystalline reaction product was filtered off. Upon recrystallization from a mixture of methylene chloride, ether and petroleum ether the pure 1-benzyl-7-chloro-5-phenyl-3H-1,4-benzodiazepin-2(1H)-one formed colorless prisms melting at 174–175°.

EXAMPLE 20

To a suspension of 5.75 g. of 7-chloro-5-phenyl-3H-1,4-benzodiazepin-2(1H)-one 4-oxide in 150 cc. dry benzene were added 1.08 g. sodium methoxide. About 10 cc. of the solvent containing some methanol was distilled off. 2.34 cc. of ethyl bromide was then added and the mixture was refluxed for 20 hours. The reaction mixture was then diluted with ice water, the organic layer was separated, dried and concentrated in vacuo. The oily residue was crystallized from a mixture of methylene chloride and petroleum ether and yielded crude reaction product which upon recrystallization from a mixture of acetone and petroleum ether gave the pure 7 - chloro - 1 - ethyl - 5-phenyl - 3H - 1,4 - benzodiazepin-2(1H)-one 4-oxide as colorless plates melting at 207–208°.

EXAMPLE 21

A solution of 4 g. of 7-chloro-1-ethyl-5-phenyl-3H-1,4-benzodiazepin-2(1H)-one 4-oxide in 180 cc. of methanol was hydrogenated in the presence of 5 g. of wet Raney nickel at room temperature and atmospheric pressure. The uptake stopped after the absorption of 1 mole of hydrogen. The mixture was then filtered and the solution concentrated in vacuo to dryness. The oily residue was crystallized from acetone and yielded crude reaction product. The pure 7-chloro-1-ethyl-5-phenyl-3H - 1,4 - benzodiazepin-2(1H)-one after crystallization from acetone forms colorless prisms melting at 127–128°.

We claim:

1. A process for producing 5-phenyl-3H-1,4-benzodiazepin-2(1H)-one 4-oxides which comprises treating a 2-halomethyl-4-phenyl-quinazoline 3-oxide with an alkali hydroxide.

2. A process for the preparation of a compound of the formula

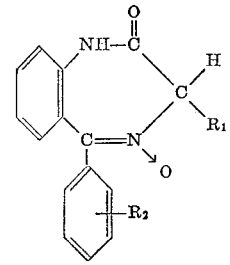

wherein R₁ is selected from the group consisting of hydrogen and lower alkyl; and R₂ is selected from the group consisting of hydrogen and halogen;

which comprises treating a compound of the formula

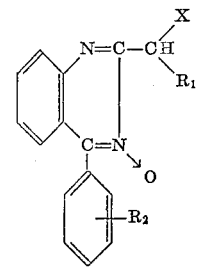

wherein R₂ has the same meaning as above; and X is selected from the group consisting of bromine and chlorine, with sodium hydroxide.

3. A process for the preparation of a compound of the formula

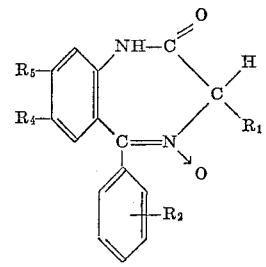

wherein R₁ is selected from the group consisting of hydrogen and lower alkyl; R₂ is selected from the group consisting of hydrogen and halogen; and R₄ and R₅ are each selected from the group consisting of hydrogen, chlorine, bromine and methyl;

which comprises treating a compound of the formula

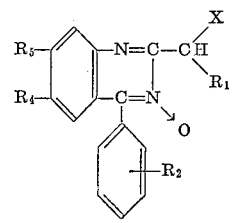

wherein R₁, R₂, R₄ and R₅ have the same meaning as above; and X is selected from the group consisting of bromine and chlorine, with sodium hydroxide.

4. A process for the preparation of 7-chloro-5-phenyl-3H-1,4-benzodiazepin-2(1H)-one 4-oxide which comprises treating 6-chloro-2-halomethyl-4-phenyl-quinazoline 3-oxide with an alkali hydroxide.

5. A process for the preparation of 7-chloro-5-phenyl-3H-1,4-benzodiazepin-2(1H)-one 4-oxide which comprises treating 6-chloro-2-chloromethyl-4-phenyl-quinazoline 3-oxide with an alkali hydroxide.

6. A process for the preparation of 7-chloro-5-phenyl-3H-1,4-benzodiazepin-2(1H)-one 4-oxide which comprises treating 6-chloro-2-chloromethyl-4-phenyl-quinazoline 3-oxide with sodium hydroxide.

7. A process for the preparation of 7-chloro-5-phenyl-3H-1,4-benzodiazepin-2(1H)-one 4-oxide which comprises treating 6-bromo-2-halomethyl-4-phenyl-quinazoline 3-oxide with an alkali hydroxide.

No references cited.

WALTER A. MODANCE, *Primary Examiner.*

R. T. BOND, *Assistant Examiner.*